United States Patent
Aoki et al.

(10) Patent No.: US 7,421,585 B2
(45) Date of Patent: Sep. 2, 2008

(54) METHOD, APPARATUS & COMPUTER PROGRAM PRODUCT FOR USING A LEASE TO MANAGE INTERPERSONAL ACCESS THROUGH COMPUTER-MEDIATED COMMUNICATION SYSTEMS

(75) Inventors: Paul M. Aoki, Foster City, CA (US); Allison G. Woodruff, Foster City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 872 days.

(21) Appl. No.: 10/871,983

(22) Filed: Jun. 18, 2004

(65) Prior Publication Data
US 2005/0281248 A1    Dec. 22, 2005

(51) Int. Cl.
*G06F 9/00* (2006.01)

(52) U.S. Cl. .................. 713/182; 713/151; 713/164; 713/165; 713/168

(58) Field of Classification Search .............. 713/182, 713/161, 164, 165, 168
See application file for complete search history.

(56) References Cited

OTHER PUBLICATIONS

Gray et al., "Leases: An Efficient Fault-Tolerant Mechanism For Distributed File Cache Consistency,"*Proc. SOSP 1989*, ACM (1989), pp. 202-210.
Zaner et al., "3° And the Net Generation: Designing For Inner Circles Of Friends," *Proc. Ubicomp 2003 Wksp. On Intimate Ubiquitous Computing*, 2003, pp. 50-52, Seattle, WA.

*Primary Examiner*—Thomas R Peeso
(74) *Attorney, Agent, or Firm*—Patrick J. S. Inouye; Scott E. Smith

(57) ABSTRACT

Apparatus, methods, and computer program products are disclosed that use a lease to manage interpersonal communications over a computer-mediated network such as a telephone network or the Internet, whether using textual, audio, or video communication means. The use of the lease allows enables negotiated evolution and revocation of a communication privilege in a socially-acceptable manner.

55 Claims, 5 Drawing Sheets

METHOD, APPARATUS & COMPUTER PROGRAM PRODUCT FOR USING A LEASE TO MANAGE INTERPERSONAL ACCESS THROUGH COMPUTER-MEDIATED COMMUNICATION SYSTEMS

BACKGROUND OF THE INVENTION

1. Field of the Invention

This invention relates to the field of computer-mediated human communication systems.

2. Background

Existing access control mechanisms for human communication channels do not adequately reflect the dynamic nature of personal relationships, that is, (1) that people's management of their accessibility with respect to specific people evolves over time, (2) that people's management of their accessibility with respect to specific channels evolves over time, and (3) that accessibility is an asymmetric, interpersonal relationship that is socially negotiated on an ongoing basis.

Humans have a limited ability to process information through their senses. As a result, people typically limit the number of information channels that are simultaneously active around them. Human attention can be thought of as a limited resource that must be managed as more and more immediate inter-personal communication mechanisms arise.

In commonly-used communication systems, access control is "by obscurity"—once the address of a device (such as a phone number) is known, access is allowed for the indefinite future to all who know of, or who can be given, the address. From the perspective of the address' owner, it would be desirable to be able to revoke access, but existing revocation methods have drawbacks: canceling an address puts administrative burdens on the address' owner, and explicit revocation (as in password expiration) is heavyweight and often has negative social consequences.

Further, the desire for contact is often asymmetric and it can be socially awkward to refuse to provide contact information to another. For example, a person can be perceived as rude if they refuse to give someone their phone number.

Access control mechanisms in computer-mediated communication technologies do not adjust well to meet these challenges. More specifically, in many current technologies, access control mechanisms rely on access to a static piece of contact information, such as a phone number. Once someone has another person's phone number, email address, etc., they are able to contact that person until the phone number, email address, etc. is changed. Thus, this type of static access does not meet people's changing needs.

A few access control mechanisms exist that address a subset of these issues. For example, some existing mechanisms do provide support for timeouts. As a specific example, temporary phone numbers may be supplied as part of dating services. Such phone numbers are active for a specific duration of time; they cease to be active once that time period has passed and can not be renewed.

It would be advantageous to provide a mechanism for access control that enables negotiated evolution and revocation of a communication privilege in a socially-acceptable manner.

DESCRIPTION OF THE PREFERRED EMBODIMENTS

Figure 1:
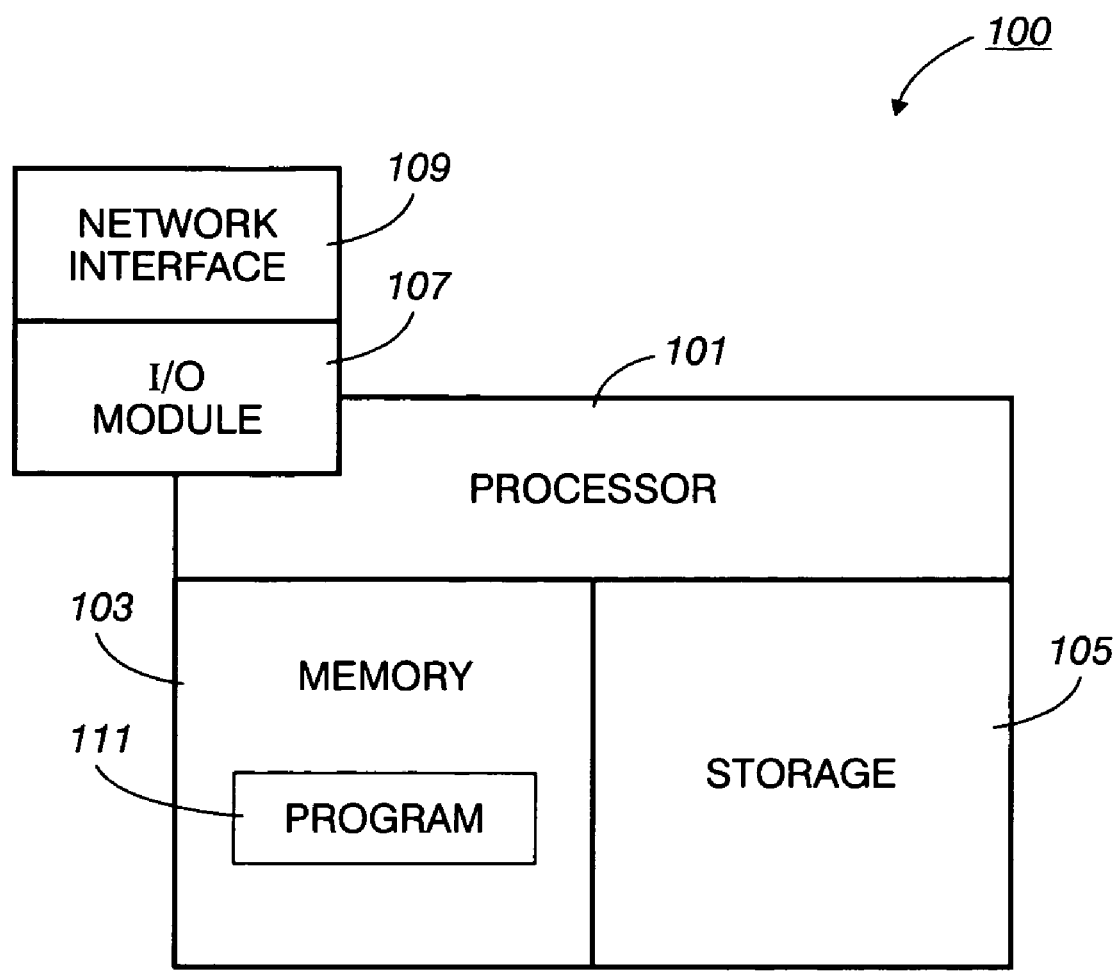
FIG. 1 illustrates a networked computer system in accordance with an ent.

Aspects of the invention provide a flexible mechanism to control access to communications between people and that provides social advantages over previous mechanisms.

One aspect of the invention is a communication system that uses communication leases for the purpose of access control for human communication channels. The communication system mediates access to a channel or content in a channel by computational means. By "human communication channel," we mean a channel by which information is communicated to a person. One embodiment of the invention is a computer-mediated communication system.

Leases are the conceptual basis of a widely-applied model for resource management used in the design of distributed computing systems. Historically, a lease is defined to be "a contract by which one conveys real estate, equipment, or facilities for a specified term and for a specified rent; also: the act of such conveyance or the term for which it is made." The lease model's derivation from the legal concept is largely by analogy—rents are usually abstract rather than monetary, the conveyance is of a virtual resource rather than real property, and the agents are usually system components rather than humans per se.

In the lease model, a resource manager leases access rights to a resource consumer for an explicitly negotiated duration. At the end of this duration, the resource manager manually or automatically revokes the resource consumer's rights (that is, the lease expires) unless the resource manager and resource consumer renegotiate and agree to renew the lease. In some embodiments the resource consumer can also voluntarily cancel a lease.

The key aspects of a leased resource, then, are:

Initial access is by negotiation between the resource manager and resource consumer.

In the absence of appropriate subsequent interaction, access to the resource expires without further action on the resource manager's part.

Renewal occurs only by negotiation, that is, if the resource manager and resource consumer both act and concur.

Because human attention is a limited resource that must be managed, communication leases can be used to control access to this resource. Communication leases share the aspects described above (negotiated initial access, automatic access expiration, negotiated access renewal).

Such an access control mechanism is often needed in modern telecommunications. For example, person A may want to limit person B's access to them to email contact, while they would like person C to be able to reach them via email or the phone. A person's interest in being contacted by another person therefore relates to both who can contact them and the human communication channel used by that person to do so.

What is required is a mechanism for access control that enables negotiated evolution and revocation in a socially-acceptable manner. One aspect of the invention is to provide leases of temporary duration that are renewable based on conditions. Leasing is a simple mechanism that specifies a set of key processes for local aspects of resource management (granting negotiations, implicit revocation, renewal negotiations). While the use of leases has been proposed for computer systems design, the application of leases in the domain of interpersonal computer-mediated communication has not.

One skilled in the art will understand that the network transmits information (such as data that can be operated on by a computer program as well as data that defines a computer program). This information can, but need not be, embodied within a carrier-wave. The term "carrier-wave" includes electromagnetic signals, visible or invisible light pulses, signals on a data bus, or signals transmitted over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer usable data carrier.

One skilled in the art will understand that a procedure is a self-consistent sequence of computerized steps that lead to a desired result. These steps can be defined by one or more computer instructions. These steps can be performed by a computer executing the instructions that define the steps. Thus, the term "procedure" can refer (for example, but without limitation) to a sequence of instructions, a sequence of instructions organized within a programmed-procedure or programmed-function, or a sequence of instructions organized within programmed-processes executing in one or more computers. Such a procedure can also be implemented directly in circuitry that performs the steps. The term logic includes circuitry that performs the procedure (both fixed circuitry) and programmed circuitry.

FIG. 1 illustrates a networked computer system 100 that can incorporate aspects of the invention. The networked computer system 100 includes a processor 101, a memory 103, a storage 105, and an I/O interface 107. The I/O interface 107 provides the processor 101 with access to a network interface 109 (although in some embodiments the network interface 109 may be directly accessed) that enables the networked computer system 100 to communicate to a network (not shown). A program 111 can be loaded into the memory 103 so that the processor 101 can execute the instructions in the program 111. The program 111 can be loaded into the memory 103 from the storage 105 (that can be a computer readable media such as a disk, read only memory, flash memory, or other data storage device that can be loaded into the networked computer system 100) or through the I/O interface 107 or the network interface 109. If the program 111 is downloaded through the network interface 109 it is generally transported by being embodied within an electromagnetic carrier wave or other wired or wireless data transfer technology. However, the program 111 could as well be received using any means of transferring data including audio wave modulation technology as well as any other data transfer means. The program 111 can be configured to cause the processor 101 to perform steps of at least one aspect of the invention.

The networked computer system 100 can be embodied as a personal computer, a telephone switch, a wired or wireless telephone, a network switch, and the like. The networked computer system 100 can also be embodied as custom circuitry that performs equivalent functions as that of a programmed computer system.

Figure 2:
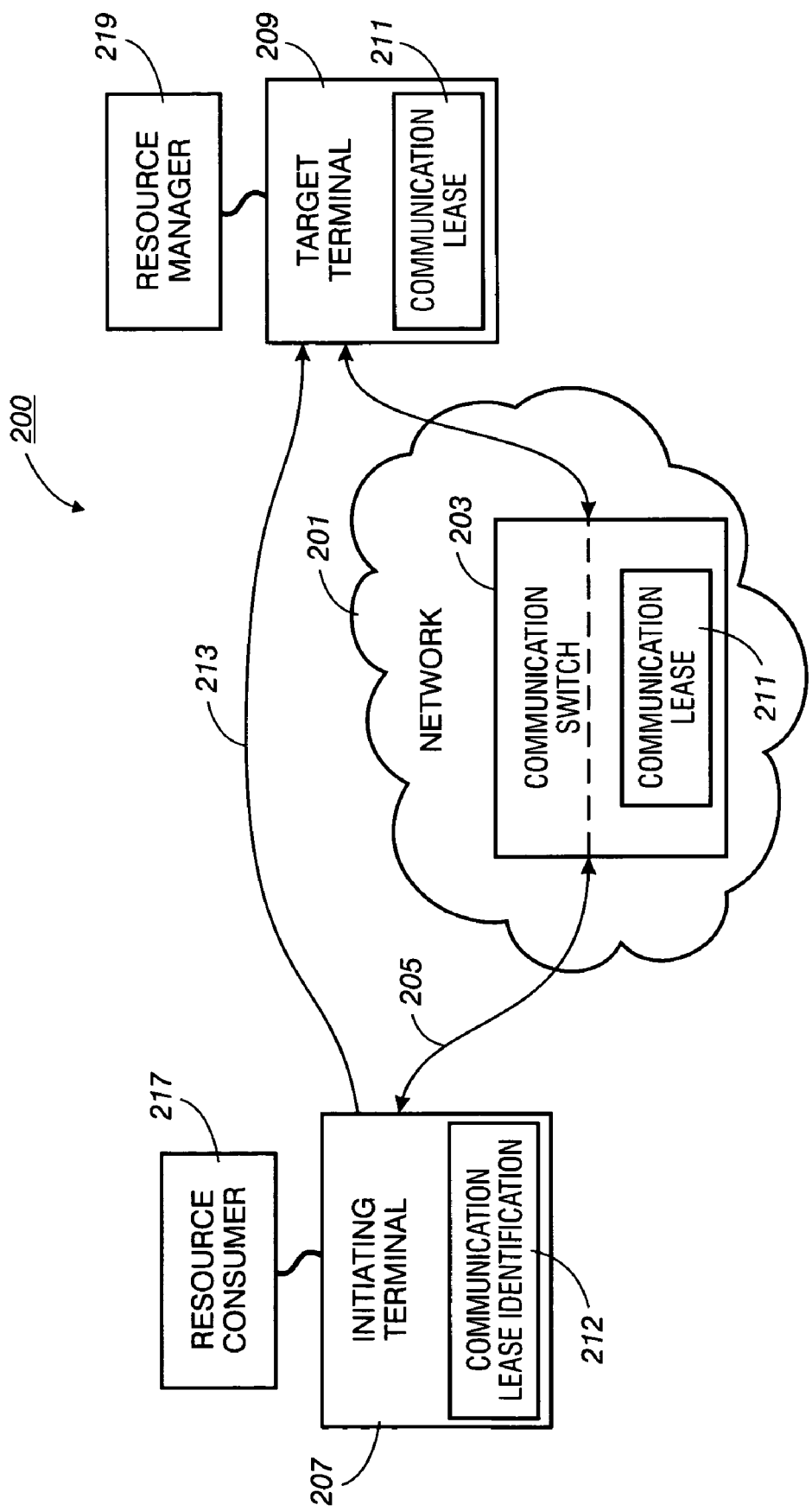
FIG. 2 illustrates a computer-mediated communication system.

FIG. 2 illustrates a computer-mediated communication system 200 that includes a network 201 that includes a communication switch 203 (such as an analog or digital telephone switch; or a networking switch using, for example, ATM or TCP/IP protocols). The network 201 can be used to create a human communication channel 205 between an initiator communication means such as an initiating terminal 207 and a target communication means such as a target terminal 209. A communication lease 211 or a communication lease identification 212 can reside at the initiating terminal 207, within the communication switch 203, or within the target terminal 209. Information related to the communication lease 211 can be exchanged, if needed, between the initiating terminal 207, the target terminal 209, and the communication switch 203 using the network 201 or an out-of-band communication channel 213. Further, in some embodiments separate portions of the communication lease 211 can be distributed throughout the components in the computer-mediated communication system 200.

The initiating terminal 207 is operated by a resource consumer 217 who desires to access the resource controlled by a resource manager 219 through the use of the communication lease 211.

According to one embodiment, the resource is that of access to the resource manager 219; the human communication channel 205 can provide either direct access or indirect access to the resource manager 219 through the target communication means. An example of a direct access is a telephone communication with the resource manager 219 or an e-mail that is not directed into a secondary folder (such as by a filter). An example of an indirect access through the target communication means is a voice message left for the resource manager 219 or directed into a secondary folder. The human communication channel 205 as used in this patent is not limited to the creation of a communication mechanism that requires each end of the channel be simultaneously open. Thus, the concept of the human communication channel 205 includes both synchronous (such as with a telephone system) and asynchronous communications (such as an e-mail system). In addition, the initiator communication means and the target communication means can have all the described functionality within a single device or can have the functionality distributed between multiple devices.

Thus, the initiator communication means and the target communication means are contemplated to be terminals for communication channels that include half- or full-duplex transmission, synchronous or asynchronous media, and audio, video, or textual content (for example, a computer terminal; a paging system, a wired, wireless, or cellular telephone device using push-to-talk technology (both immediate and store-and-forward) or standard POTS or cellular telephone technology; a two-way video conference device and the like). In addition, the target communication means (such as the target terminal 209) can include separate or combined capabilities such as separate or combined caller-id capability, communication lease authentication capability, voice-mail capability, and other optional capabilities. The initiator communication means (such as the initiating terminal 207) can also have a biometric identification reader, a short-range or contact-based data transfer reader (such as an RFID reader), a data storage access device, a data storage device, as well as other optional capabilities.

The inventors contemplate that the computer-mediated communication system 200 encompasses communication systems such as modern telephone systems, cellular telephone systems, push-to-talk communication systems, Voice over Internet Protocol systems, e-mail systems, instant messaging systems, and other electronic communication systems used by humans that have the ability to compute whether a human communication channel is to be established (or can be augmented with such an ability by applying the techniques disclosed herein).

A computer or other data processing capable device can be used to reference (access) the communication lease and to evaluate the lease's access control as it is applied to the resource manager 219 and the resource consumer 217 during an attempt to establish the human communication channel 205 between the resource consumer and the resource manager. This device can be located, for example, at the communication switch 203, at the target terminal 209 (either directly within the terminal or attached to the terminal) or can be a computer program executing on a personal computer to evaluate the lease and control access. In addition, the communication lease 211 can be stored on a completely independent location on the network and need not reside within the communication switch 203 or the target terminal 209 so long as these devices can access the communication lease 211 when needed.

One skilled in the art will notice that while the lease can be tied to a particular address for the resource consumer 217 (for example, a telephone number, e-mail address etc.), it need not be. Other validation mechanisms can be used to identify and authorize access to the lease. These include password and other authentication techniques known in the art.

Figure 3:
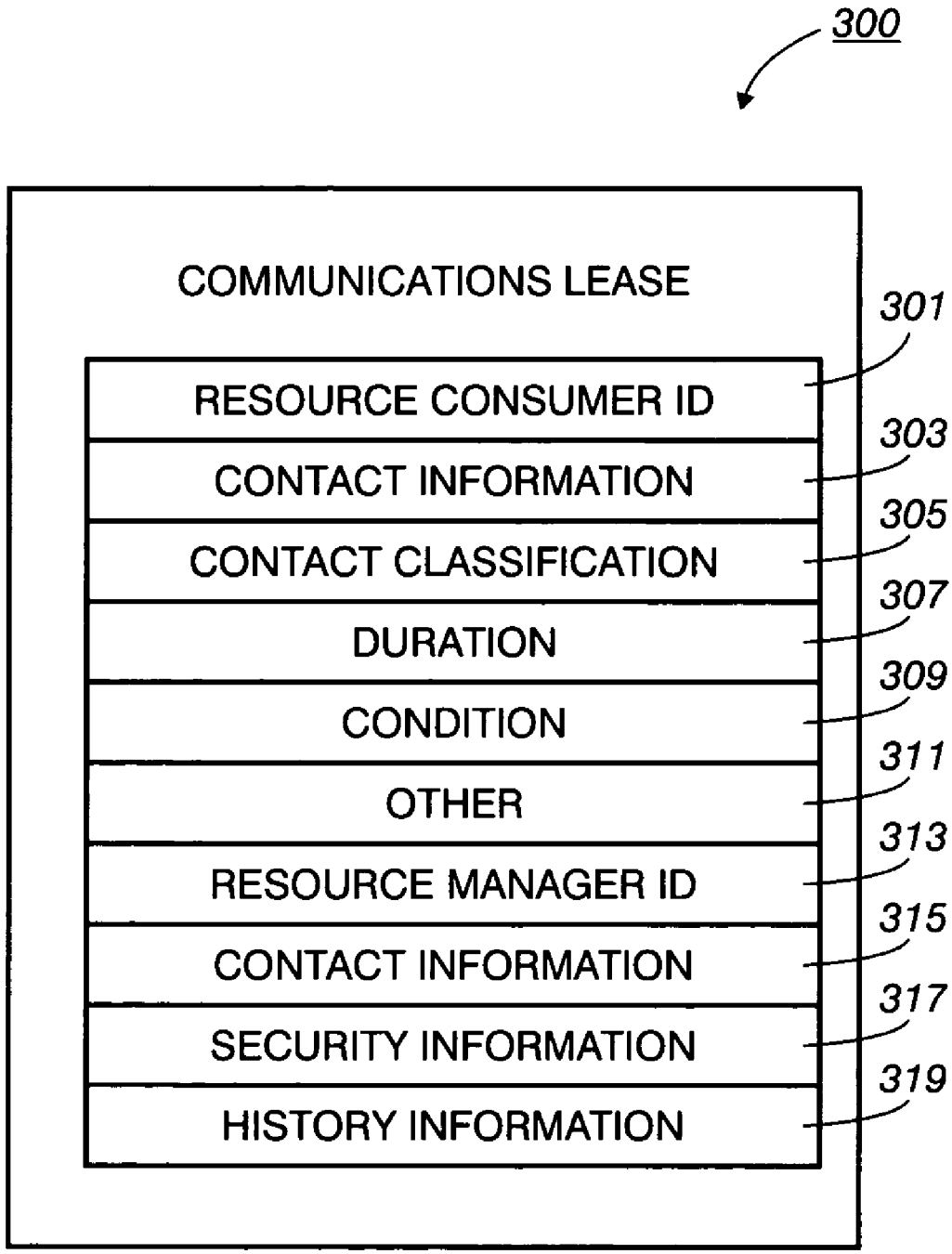
FIG. 3 illustrates one embodiment of a communication lease that can be used aspect of the invention.

FIG. 3 illustrates one embodiment of a communication lease 300. One skilled in the art will understand that there are many possible ways to organize the lease data (including tables, as hierarchal structures of various kinds, databases and the like). The communication lease 300 generally includes a 'resource consumer identification' field 301 that identifies or provides a way to identify the resource consumer, a 'contact information' field 303 that provides information about the initiating terminal 207 used to make a contact (for example, an internet address, a telephone number, password, lease identification or other similar information depending on the type of contact), a 'contact classification' field 305 that identifies the type of the information in the 'contact information' field 303, a 'duration' field 307 that specifies the effective timeframe of the communication lease 300 (for example, this field can contain a 'default expiration date' for the communication lease, as well as a 'lease-disabled delay' for an exclusion lease), a 'condition' field 309 that maintains the lease conditions (status, rules or programs) used to define an access control between the resource consumer 217 and the resource manager 219, and an 'other' field 311 for other lease information.

Furthermore, the communication lease 300 includes a 'resource manager identification' field 313 that identifies or provides a way to identify the resource manager who controls the lease, a 'contact information' field 315 for the resource manager (in this embodiment, the communication lease 300 assumes that the 'contact classification' field 305 applies to both the 'contact information' field 303 and the 'contact information' field 315; however, other embodiments need not require that the resource consumer 217 and the resource manager 219 communicate using devices that have the same contact classification), a 'security information' field 317 that maintains any required security information (such as a public key portion of a public-private key pair), and a 'history information' field 319 that maintains history information such as a log of the communications between the resource manager 219 and the resource consumer 217 that use the communication lease 300.

One skilled in the art will understand that the communication lease can have many different formats. Such formats can include splitting the communication lease between the resource consumer 217 and the resource manager 219 such that each party can monitor contact and communication history between the parties (further, portions of the communication lease can be distributed to other portions of the communication system).

In one embodiment, the resource manager 219 only has a restricted number of communication leases so that the resource manager 219 can plausibly justify cancellation of the communication lease due to the scarcity of communication leases available to the resource manager 219. This restriction can be a result of the expense of the lease, or a limit to the number of available leases. In addition, the communication lease can be a context-aware lease, a renewable lease, an exclusion lease or other type of lease.

A context-aware lease is one that maintains history information in the 'history information' field 319 such that the access control of the communication lease 300 will cause the lease to expire on satisfaction of a lease condition (for example, after some set of conditions are met). For example, one lease condition could be satisfied when there is a limited amount of communication or contact between the resource consumer 217 and the resource manager 219 over some time period, when the resource manager 219 has not returned communication attempts by the resource consumer 217, or the parties have not had personal contact or other communications over some time period. The context-aware lease provides an automatic expiration of the communication lease and adds the social ambiguity that the expiration of the lease is automatic.

A renewable lease is one that allows the resource manager 219 to explicitly renew the communication lease as it nears the end of its duration. In addition, the communication lease can be implicitly renewed by the access control of the lease on behalf of the resource manager 219 if conditions (captured in the 'history information' field 319) specified by the resource manager 219 are satisfied. In one embodiment the resource consumer 217 is not notified of the expiration or renewal of the communication lease (thus adding to the social ambiguity).

As will be described below, some embodiments of the renewable lease provide various types of ambiguity which make revocation of access more socially acceptable. By allowing automatic expiration (implicit revocation), the renewable lease generally leaves the resource consumer 217 with several alternative explanations for how the loss of access to the resource manager 219 actually occurred. Additionally, in some embodiments, the resource consumer 217 may receive little detailed information about what is going on, making it difficult to tell whether access was lost because of an explicit action (lease revocation) by the resource manager 219, an implicit action (lease expiration by the access control), a system failure, and the like.

Motivation for action. By imposing a user-visible notion of resource scarcity, an embodiment of the renewable lease that restricts the number of communication leases offers a largely depersonalized and plausible motivation for an actual evocation or a failure to renew by the resource manager 219. For example, if pressed, the resource manager 219 can argue that he/she needed to allocate the communication lease to someone else due to some kind of contingency. (Personal motivations are generally more offensive.)

Identity of actor. In an embodiment of the renewable lease that exposes the role of the system in expiring the lease, the system is a "third actor" (along with the resource manager 219 and the resource consumer 217), so there is ambiguity about which party acted to cause the change. (An action by the resource manager 219 is generally more offensive than action that can be attributed to the system.)

Nature of action taken. In an embodiment of the renewable lease such that the resource consumer 217 is not notified as to what specific actions, if any, have been taken by the resource manager 219 (although these actions can be somewhat inferred), it is ambiguous whether implicit or explicit action occurred. (Explicit action by the resource manager 219 is generally more offensive than implicit action, which can be attributed to carelessness.)

Time/context of action. In an embodiment of the renewable lease such that the resource consumer 217 is not notified when the communication lease expires, there is ambiguity as to when the change occurred; this is similar to the resource manager 219 changing his/her phone number and not contacting the resource consumer 217 to provide the new phone number. The resource consumer 217 may not even detect that the communication lease has not been renewed, or they may discover this so long after the fact that it is less offensive.

While this may intuitively feel manipulative and undesirable, in fact, the smooth progress (avoidance of confrontation) in daily situations of this kind relies heavily on such ambiguity as well as the willingness of all parties to let ambiguous accounts stand in order to preserve face.

Another communication lease is the exclusion lease. This communication lease is a variant of other communication leases that includes an additional condition that excludes communication initiated by the resource consumer 217 for some period of time. It explicitly states that communication initiated by the resource consumer 217 will not be accepted for some period of time, but after that period, communication can again be initiated by the resource consumer 217. In general, the exclusion lease will automatically convert into another form of communication lease (such as a context-aware lease or a renewable lease) at the end of its exclusion duration.

In some embodiments, the communication lease 300 can be structured so that the lease can be associated with a physical embodiment such that the resource manager 219 can physically provide the resource consumer 217 with a tangible representation of the communication lease. This could be accomplished, for example, by providing the resource consumer 217 with an encrypted data file on a flash memory, by providing a small RFID device that contains an identifier for the communication lease (in one embodiment, the inventors contemplate providing a RFID bead that could be attached to a charm bracelet), or other data transfer techniques known in the art (for example, using a storage device such as an RFID tag, a computer readable storage media, a memory device, a data file, a barcode printed on media, a pattern printed on media, and text printed on media). In addition some embodiments require that the resource consumer 217 provide some other information (such as biometric information, a password, a public key, etc.) along with the communication lease or communication lease identifier (for example, a URL, or other network identifier).

There are many ways to structure access to the communication lease. For example, the communication lease can be stored within the network 201, the communication switch 203, or with the target communication means. In addition, an identifier of the communication lease can be stored or made accessible to the initiator communication means. In some embodiments, the communication lease (or a copy thereof) can be stored at the initiator communication means.

Figure 4:
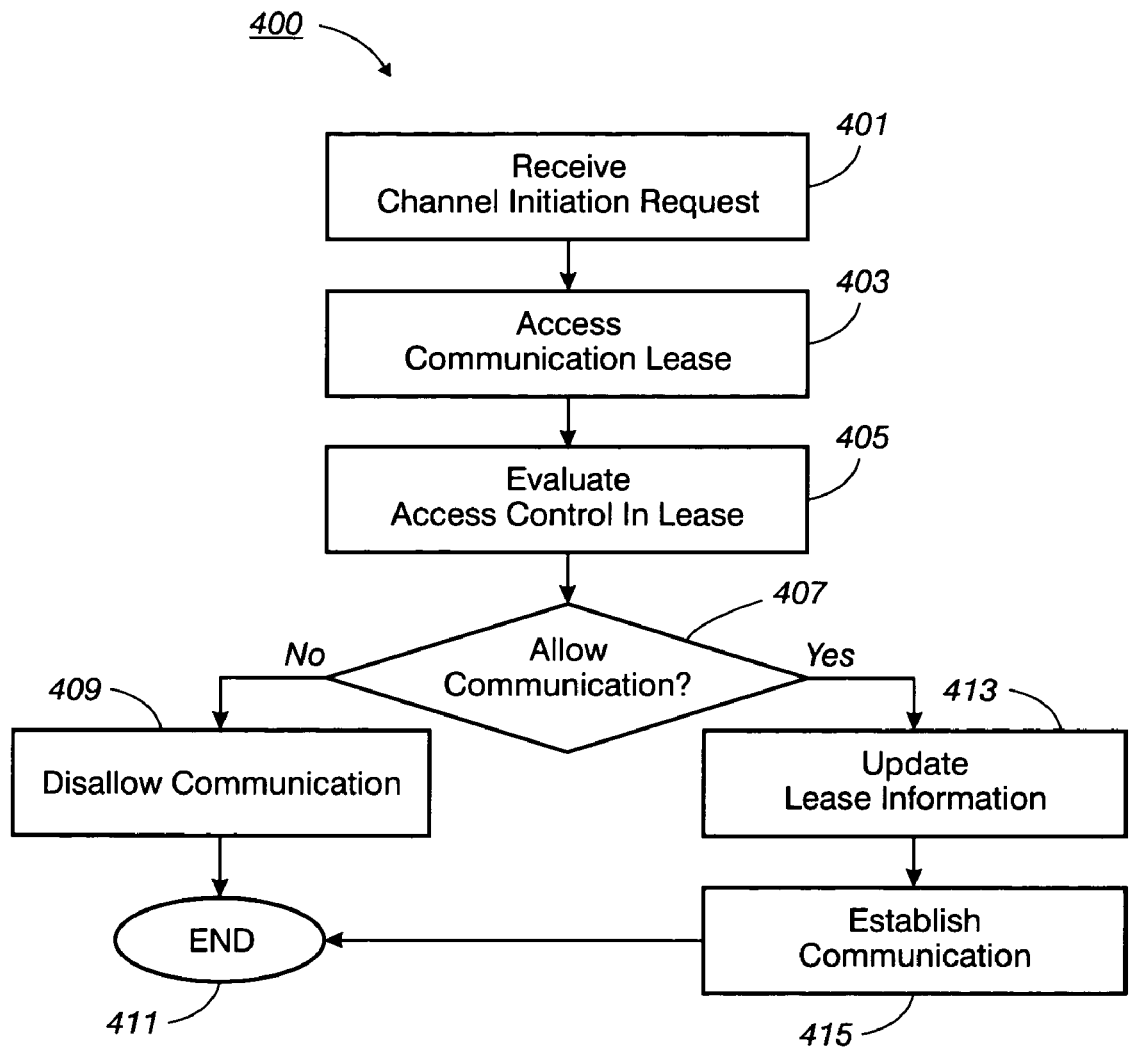
FIG. 4 illustrates a lease-based human communication channel establishment that can be used with one aspect of the invention.

FIG. 4 illustrates a lease-based human communication channel establishment process 400 that initiates at a 'receive channel initiation request' procedure 401. This process can be performed by a communication system, a communication switch and by the target communication means. The channel initiation request results from the resource consumer using the initiator communication means (such as the initiating terminal 207) to attempt to open a human communication channel to the resource manager at the target communication means (such as the target terminal 209). The channel initiation request is received by receiver logic (or detection logic) and generally includes information about the initiator communication means and the target communication means (such as an identification of the initiating terminal 207 and the target terminal 209). The initiating request, for example, can include the communication lease identifier, a biometric reading of the resource consumer 217, a password known by the resource consumer 217, a public-key of the resource consumer 217, etc. The initiating request can consist of multiple protocol steps (in a telephone system for example, sending a caller ID to the target terminal 209, detecting a connection, sending a communication lease identification, receiving approval for the human communication channel and then opening the human communication channel). The actual protocol steps depend on the configuration of the computer-mediated communication system 200 and the details as to where and how the communication lease is stored and accessed. One skilled in the art would be able to implement such a protocol without undue experimentation.

The 'receive channel initiation request' procedure 401 can be accomplished at the target terminal 209 or the communication switch 203 depending on the embodiment.

Once the channel initiation request is received, the lease-based human communication channel establishment process 400 continues to an 'access communication lease' procedure 403 that references or locates and references the communication lease 211 using lease look-up logic. The reference to the communication lease 211 is generally by accessing the lease (opening the lease, reading the lease etc.). In embodiments where the communication lease is accessible by the communication switch 203, the switch can locate the communication lease using information in the 'contact information' field 303 and in the 'contact information' field 315, as well as information provided by the resource consumer 217 (such as a password, lease identification, biometric data, etc.).

In embodiments where the communication lease is accessible (referenced) by the target terminal 209, the terminal can locate the communication lease using information in the 'contact information' field 303, as well as information provided by the resource consumer 217 (such as a password, lease identification, biometric data, etc.).

In embodiments where the communication lease identification 212 is accessible by the initiating terminal 207, the initiator communication means can send the communication lease identification 212 directly to the target communication means along with information provided by the resource consumer 217 (such as a password, lease identification, biometric data, etc.). The communication lease identification 212 can be provided to the resource consumer 217 in the form of an RFID bead, a data file transmitted over a network, a data file provided on a computer readable media, etc. The target communication means can then reference (access) the communication lease 211 identified by the communication lease identification 212.

Once the communication lease 211 is referenced, an 'evaluate access control' procedure 405 can use decision logic that evaluates the state of the communication lease 211 by, for example, processing rules that can be stored in the 'condition' field 309 that access lease fields such as the 'duration' field 307, other portions of the 'condition' field 309, the 'history information' field 319, etc. An 'allow communication' decision procedure 407 uses the results of the 'evaluate access control' procedure 405 to determine whether the conditions in the communication lease 211 allow creation of the human communication channel 205. If the communication lease 211 has expired, or if other conditions related to the communication lease 211 are not met, the lease-based human communication channel establishment process 400 continues to a 'disallow communication' procedure 409 and no direct or indirect human communication channel will be created between the resource consumer 217 and the resource manager 219.

Some embodiments may allow indirect communication. For example, a telephone answering machine that includes an embodiment of the invention can be configured to only accept telephone calls (and generate a ring) from resource consumers who have valid leases. Thus, the phone of the resource manager 219 would only ring for call attempts from resource consumers who have a valid communication lease. The telephone answering machine could also be configured such that call attempts that invoke an invalid lease would not cause a ring but could allow voice messages from the associated resource consumer 217 to be captured. Some leases can be configured so that they provide access only through voice messaging such that there would never be a direct communication between the resource consumer 217 and the resource manager 219.

After the 'disallow communication' procedure 409, the lease-based human communication channel establishment process 400 continues to an 'end' terminal 411.

If at the 'allow communication' decision procedure 407, the communication lease conditions are satisfied, the lease-based human communication channel establishment process 400 continues to an 'update lease information' procedure 413 that accesses the communication lease 300 to update the 'history information' field 319 to show that the resource consumer 217 attempted to contact the resource manager 219 and that the lease allowed the direct or indirect connection. An 'establish communication' procedure 415 then completes the human communication channel 205 and the lease-based human communication channel establishment process 400 completes through the 'end' terminal 411.

One skilled in the art will understand that some embodiments can additionally track rejected attempts to establish the human communication channel 205, can track information about the duration of communication, and in some embodiments may provide the ability to record all or portions of the communications. In addition, embodiments that provide the ability to record all or portions of the communications may process the communication content using known techniques for assessing contextual states of the communicating parties. One use of these contextual state assessments is as an input to processing rules that can be stored in the 'condition' field 309. For example, known techniques for probabilistic estimation of human emotional state from acoustic features of human speech can be applied to recorded communications. These probabilistic estimates can be used in various kinds of processing rules, such as processing rules that disallow communication at the current time or reduce the communication lease duration to hasten its expiration. A history of contextual state assessments can additionally be stored in the 'history information' field 319.

The out-of-band communication channel 213 is any communication related to the lease that is performed outside of the human communication channel 205. This includes communications between ubiquitous computing devices as well as communications that result from the passing of data between the parties, or changes made to the lease directly by the resource manager 219. While information regarding activity over the human communication channel 205 can be saved in the lease responsive to communication attempts, information gathered from the out-of-band communication channel 213 can also be saved in the lease for later use.

The type and conditions of the communication lease 211 can be negotiated between the resource consumer 217 and the resource manager 219. In addition, the resource manager 219 can initially provide the lease on an as-is basis. Access to the lease can be provided to the resource consumer 217 through sharing of a file (such as by sharing information between PDA's, cellular phones, or other ubiquitous computing device), memory stick, flash memory, RFID device, etc. that contains either a portion of the lease or an identification of the lease.

The information in the 'history information' field 319 can be updated by attempted, successful direct and indirect contacts, and unsuccessful contacts between the resource consumer 217 and the resource manager 219 including contacts initiated by the resource manager 219. In addition, with discovery protocols in Bluetooth enabled devices, Wi-Fi enabled devices and other ubiquitous computing devices, the communication lease can collect information regarding occasions when the resource consumer 217 and the resource manager 219 were in physical proximity (for example, within the discovery range of the devices, or by exchanging Global Positioning System information). This implicit contact information can also be incorporated in the access control decision process.

Figure 5:
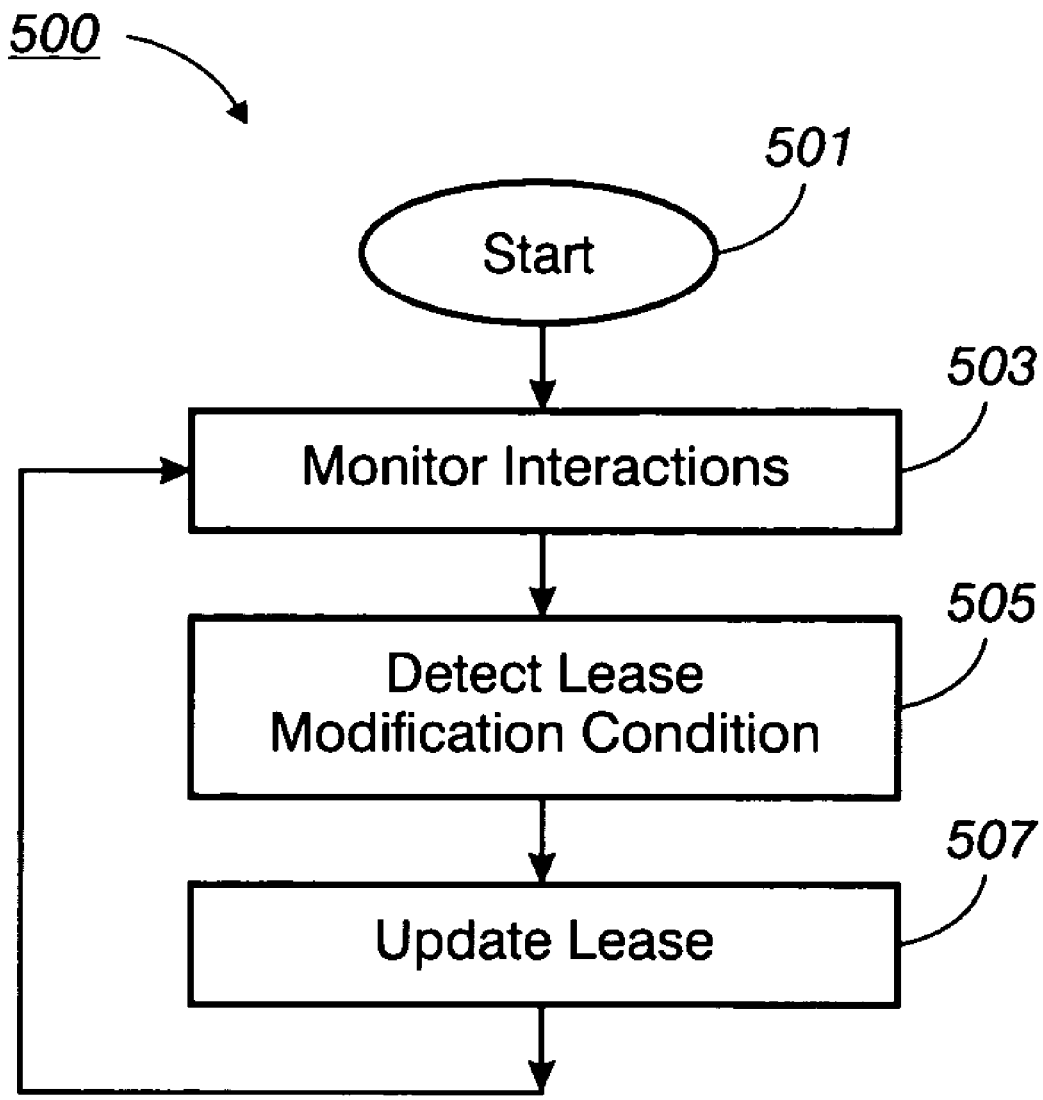
FIG. 5 illustrates a communication lease update process.

FIG. 5 illustrates a communication lease update process 500 that can be used to detect conditions that modify the communication lease 300. The communication lease update process 500 initiates at a start terminal 501 responsive to the resource manager 219 explicitly initiating a modification to the lease. The communication lease update process 500 can also be initiated by the 'update lease information' procedure 413 of FIG. 4. Once initiated, the communication lease update process 500 continues to a 'monitor interactions' procedure 503 that monitors the commands specified by the resource manager 219, as well as operations that could cause changes in the 'history information' field 319 (such as successful direct or indirect contacts, and when the parties are within local proximity of each other, as well as expiration of duration etc.). A 'detect lease modification condition' procedure 505 detects when the communication lease 300 needs to be modified. When that condition is met, the communication lease update process 500 continues to an 'update lease' procedure 507 that updates the portions of the lease affected by the condition. This update can disable or enable the lease, can update the 'history information' field 319, or update or change any other field in the lease. Once the lease is updated, the communication lease update process 500 continues back to the 'monitor interactions' procedure 503.

Yet another aspect of the invention is that of controlling notification of the resource consumer of the presence (or availability) of the resource manager. One example where a communication lease could be used with this aspect of the invention is that of an instant messaging system. These systems allow one person to generally know when another person is accessible by presenting presence information. In computer-mediated communication systems that present presence information, it would be desirable to control on an individual basis who can receive presence information. Controlling access to presence information poses many of the same social difficulties as controlling access to other human communication resources (such as direct or indirect access to a resource manager). For example, explicitly revoking access to presence information may be considered rude, just as explicitly blocking other forms of communication may be considered rude. Communication leases can be applied to the problem of access control to presence information. In this case, the resource being managed is access to a particular resource manager's presence information, and the human communication channel is the channel passing presence information between the resource manager and the resource consumer. This aspect of the invention would be very relevant to instant messaging systems, push-to-talk communication systems, as well as generally useful in other human communication technologies that utilize presence information.

One skilled in the art will understand that aspects of the invention provide a person with increased control over electronic or computer-mediated communications with others. The need for this increased control results from the realization that: (1) people's management of their accessibility with respect to specific people evolves over time, (2) people's management of their accessibility with respect to specific channels evolves over time, and (3) accessibility is an asymmetric, interpersonal relationship that is socially negotiated on an ongoing basis. Aspects of the invention provide a more flexible mechanism for access control that provides social advantages over previous mechanisms.

Although aspects of the present invention have been discussed in terms of the embodiments described herein, one skilled in the art will understand that various modifications and alterations may be made without departing from the scope of the invention. Accordingly, the scope of the invention is not to be limited to the particular invention embodiments discussed herein.

What is claimed follows:

1. A method for using a communication lease in a communication system, said method comprising steps of:
   detecting an attempt, by a resource consumer using an initiator communication means, to obtain an access to a resource manager through a target communication means;
   referencing said communication lease, said communication lease comprising an access control related to said resource consumer and said resource manager;
   conditionally allowing said access, responsive to said access control, between said initiator communication means and said target communication means; and
   automatically modifying said communication lease responsive to said attempt.

2. The computer controlled method of claim 1, wherein the step of conditionally allowing said access further comprises:
   determining, responsive to said access control, whether said access to said target communication means is to be a direct access; and
   conditionally allowing, responsive to the step of determining, said direct access to said target communication means.

3. The computer controlled method of claim 1, wherein the step of conditionally allowing said access further comprises:
   determining, responsive to said access control, whether said access to said target communication means is to be an indirect access; and
   conditionally storing, responsive to the step of determining, a communication from said initiator communication means for later access by said target communication means.

4. The computer controlled method of claim 1, wherein said communication lease is one of a plurality of communication leases controlled by said resource manager.

5. The computer controlled method of claim 4, wherein there are a restricted number of said plurality of communication leases.

6. The computer controlled method of claim 1, wherein said communication lease is selected from a group consisting of a context-aware lease, a renewable lease, and an exclusion lease.

7. The computer controlled method of claim 1, wherein said communication lease controls access to presence information related to said resource manager.

8. The computer controlled method of claim 1, wherein said communication lease includes a lease condition.

9. The computer controlled method of claim 1, wherein said target communication means is associated with a classification and wherein said communication lease further comprises said classification.

10. The computer controlled method of claim 1, wherein a portion of said communication lease is made available to said resource consumer via a storage device selected from a group consisting of an REID tag, a computer readable storage media, a memory device, a data file, a barcode printed on media, a pattern printed on media, and text printed on media.

11. The computer controlled method of claim 1, wherein an identification of said communication lease is provided to said resource consumer via a storage device selected from a group consisting of a REID tag, a storage device, a memory device, a data file, a barcode printed on media, a pattern printed on media, and text printed on media.

12. The computer controlled method of claim 1, wherein the step of conditionally initiating further comprises:
   detecting expiration of said communication lease.

13. The computer controlled method of claim 1, further comprising automatically modifying said communication lease responsive to detection of physical proximity of said resource manager and said resource consumer.

14. A method for using a communication lease in a communication switch, said method comprising steps of:
   receiving, by said communication switch, a channel initiation request containing a resource consumer identifier and a target communication means identifier, said resource consumer identifier associated with a resource consumer, said target communication means identifier associated with a resource manager;
   referencing said communication lease responsive to said resource consumer identifier, said communication lease comprising an access control related to said resource consumer and said resource manager; and
   determining whether to initiate a human communication channel responsive to said resource consumer identifier, said target communication means identifier, and said access control.

15. The computer controlled method of claim 14, wherein said human communication channel is established to provide said resource consumer with indirect access to said resource manager.

16. The computer controlled method of claim 14, wherein said channel initiation request comprises a plurality of communications between said communication switch and an initiator communication means associated with said resource consumer.

17. The computer controlled method of claim 16, wherein one of said plurality of communications comprises an identifier of said communication lease.

18. The computer controlled method of claim 16, wherein one of said plurality of communications comprises a biometric measurement of said resource consumer.

19. A method for using a communication lease at a target communication means, said method comprising steps of:
- receiving a channel initiation request containing a resource consumer identifier;
- referencing said communication lease, said communication lease comprising an access control related to said resource consumer and a resource manager associated with said target communication means; and
- determining whether to establish a human communication channel responsive to said channel initiation request, said resource consumer identifier, said target communication means identifier, and said access control.

20. The computer controlled method of claim 19, wherein said channel initiation request comprises a plurality of communications between said target communication means and an initiator communication means associated with a resource consumer.

21. The computer controlled method of claim 20, wherein one of said plurality of communications comprises an identifier of said communication lease.

22. The computer controlled method of claim 20, wherein one of said plurality of communications comprises a biometric measurement of said resource consumer.

23. The computer controlled method of claim 19, wherein said human communication channel is established to provide a resource consumer with indirect access to said resource manager.

24. The computer controlled method of claim 23, wherein a communication from said resource consumer is stored for conditional retrieval by said resource manager.

25. A communication system comprising:
- a detection logic configured to detect an attempt, by a resource consumer using an initiator communication means, to obtain an access to a resource manager though a target communication means;
- a lease look-up logic, responsive to the detection logic, configured to reference a communication lease, said communication lease comprising an access control related to said resource consumer and said resource manager;
- a decision logic configured to conditionally allow said access, responsive to said access control, between said initiator communication means and said target communication means; and
- a lease update logic configured to automatically modify said communication lease responsive to detection of physical proximity of said resource manager and said resource consumer.

26. The communication system of claim 25, wherein the decision logic further comprises:
- an access determination logic configured to determine, responsive to said access control, whether said access to said target communication means is to be a direct access; and
- a direct access establishment logic configured to conditionally allow, responsive to the access determination logic, said direct access to said target communication means.

27. The communication system of claim 25, wherein the decision logic said access further comprises:
- an access determination logic configured to determine, responsive to said access control, whether said access to said target communication means is to be an indirect access; and
- conditionally storing, responsive to the access determination logic, a communication from said initiator communication means for later access by said target communication means.

28. The communication system of claim 25, wherein said communication lease is selected from a group consisting of a context-aware lease, a renewable lease, and an exclusion lease.

29. The communication system of claim 25, wherein said communication lease includes a duration.

30. The communication system of claim 25, wherein said communication lease includes a lease condition.

31. The communication system of claim 25, wherein an identification of said communication lease is provided to said resource consumer via a storage device selected from a group consisting of a RFID tag, a storage device, a memory device, a data file, a barcode printed on media, a pattern printed on media, and text printed on media.

32. The communication system of claim 25, wherein the decision logic further comprises:
- a lease expiration logic configured to detect expiration of said communication lease.

33. The communication system of claim 25, further comprising a lease modification logic configured to allow modification of said communication lease by said resource manager.

34. communication switch comprising:
- a receiver logic configured to receive a channel initiation request containing a resource consumer identifier and a target communication means identifier, said resource consumer identifier associated with a resource consumer, said target communication means identifier associated with a resource manager;
- a lease look-up logic, responsive to the receiver logic, configured to reference a communication lease responsive to said resource consumer identifier, said communication lease comprising an access control related to said resource consumer and said resource manager; and
- a decision logic configured to conditionally initiate a human communication channel responsive to said resource consumer identifier, said target communication means identifier, and said access control.

35. The communication switch of claim 34, wherein said channel initiation request comprises a plurality of communications between said communication switch and an initiator communication means associated with said resource consumer.

36. The communication switch of claim 35, wherein one of said plurality of communications comprises an identifier of said communication lease.

37. The communication switch of claim 35, wherein one of said plurality of communications comprises a biometric measurement of said resource consumer.

38. The communication switch of claim 34, wherein said human communication channel is established to provide said resource consumer with indirect access to said resource manager.

39. A target communication means comprising:
- a receiver logic configured to receive a channel initiation request containing a resource consumer identifier;
- a lease look-up logic, responsive to the receiver logic, configured to reference a communication lease, said communication lease comprising an access control related to said resource consumer and a resource manager associated with said target communication means; and
- a decision logic configured to conditionally establish a human communication channel responsive to said channel initiation request, said resource consumer identifier, said target communication means identifier, and said access control.

40. The target communication means of claim 39, wherein said channel initiation request comprises a plurality of communications between said target communication means and an initiator communication means associated with a resource consumer.

41. The target communication means of claim 40, wherein one of said plurality of communications comprises an identifier of said communication lease.

42. The target communication means of claim 40, wherein one of said plurality of communications comprises a biometric measurement of said resource consumer.

43. The target communication means of claim 39, wherein said human communication channel is established to provide a resource consumer with indirect access to said resource manager.

44. The target communication means of claim 43, wherein a communication from said resource consumer is stored for conditional retrieval by said resource manager.

45. A computer-readable storage medium storing instructions that when executed by a computer associated with a communication switch cause the computer to perform a method for using a communication lease, the method comprising:
  receiving, by said communication switch, a channel initiation request containing a resource consumer identifier and a target communication means identifier, said resource consumer identifier associated with a resource consumer, said target communication means identifier associated with a resource manager;
  referencing said communication lease responsive to said resource consumer identifier, said communication lease comprising an access control related to said resource consumer and said resource manager; and
  determining whether to initiate a human communication channel responsive to said resource consumer identifier, said target communication means identifier, and said access control.

46. The computer-readable storage medium of claim 45, wherein said channel initiation request comprises a plurality of communications between said communication switch and an initiator communication means associated with said resource consumer.

47. The computer-readable storage medium of claim 46, wherein one of said plurality of communications comprises an identifier of said communication lease.

48. The computer-readable storage medium of claim 46, wherein one of said plurality of communications comprises a biometric measurement of said resource consumer.

49. The computer-readable storage medium of claim 45, wherein said human communication channel is established to provide said resource consumer with indirect access to said resource manager.

50. A computer-readable storage medium storing instructions that when executed by a computer associated with a target communication means cause the computer to perform a method for using a communication lease, the method comprising:
  receiving a channel initiation request containing a resource consumer identifier;
  referencing said communication lease, said communication lease comprising an access control related to said resource consumer and a resource manager associated with said target communication means; and
  determining whether to establish a human communication channel responsive to said channel initiation request, said resource consumer identifier, said target communication means identifier, and said access control.

51. The computer-readable storage medium of claim 50, wherein said channel initiation request comprises a plurality of communications between said target communication means and an initiator communication means associated with a resource consumer.

52. The computer-readable storage medium of claim 51, wherein one of said plurality of communications comprises an identifier of said communication lease.

53. The computer-readable storage medium of claim 51, wherein one of said plurality of communications comprises a biometric measurement of said resource consumer.

54. The computer-readable storage medium of claim 50, wherein said human communication channel is established to provide a resource consumer with indirect access to said resource manager.

55. The computer-readable storage medium of claim 54, wherein a communication from said resource consumer is stored for conditional retrieval by said resource manager.

* * * * *